United States Patent
Cochinwala et al.

(10) Patent No.: US 8,448,159 B2
(45) Date of Patent: May 21, 2013

(54) METHOD AND SYSTEM FOR POLICY ENABLED PROGRAMMING

(75) Inventors: Munir Cochinwala, Basking Ridge, NJ (US); Josephine Micallef, Maplewood, NJ (US); John R. Wullert, II, Martinsville, NJ (US)

(73) Assignee: TTI Inventions C LLC, Wilmington, DE (US)

( * ) Notice: Subject to any disclaimer, the term of this patent is extended or adjusted under 35 U.S.C. 154(b) by 1223 days.

(21) Appl. No.: 11/982,675

(22) Filed: Nov. 2, 2007

(65) Prior Publication Data
US 2009/0119656 A1  May 7, 2009

(51) Int. Cl.
G06F 9/44 (2006.01)
H04M 3/42 (2006.01)

(52) U.S. Cl.
USPC .................. 717/168; 717/171; 379/201.03

(58) Field of Classification Search
None
See application file for complete search history.

(56) References Cited

U.S. PATENT DOCUMENTS

| | | | |
|---|---|---|---|
| 5,317,757 A | | 5/1994 | Medicke et al. |
| 5,619,698 A | * | 4/1997 | Lillich et al. .................. 717/168 |
| 5,724,406 A | | 3/1998 | Juster |
| 5,740,351 A | | 4/1998 | Kasten |
| 5,802,159 A | * | 9/1998 | Smolentzov et al. .... 379/201.03 |
| 5,826,005 A | | 10/1998 | Fuller |
| 5,940,487 A | | 8/1999 | Bunch et al. .................. 379/201 |
| 6,134,313 A | * | 10/2000 | Dorfman et al. ......... 379/201.01 |
| 6,298,481 B1 | * | 10/2001 | Kosaka et al. ................ 717/110 |
| 6,330,319 B1 | * | 12/2001 | Moghnie .................. 379/201.03 |
| 6,330,586 B1 | * | 12/2001 | Yates et al. ..................... 709/201 |
| 6,898,788 B2 | * | 5/2005 | Kosaka et al. ................. 717/162 |

(Continued)

FOREIGN PATENT DOCUMENTS

| | | |
|---|---|---|
| JP | 02-194434 | 8/1990 |
| JP | 05-289871 | 11/1993 |

(Continued)

OTHER PUBLICATIONS

Specht, T., et al., Modeling Cooperative Business Processes and Transformation to a Service Oriented Architecture, Seventh, IEEE International Conference on E-Commerce Technology [online], 2005 [retrieved Jun. 3, 2011], Retrieved from Internet: <http://ieeexplore.ieee.org/stamp/stamp.jsp?tp=&arnumber=1524052>, pp. 1-8.*

(Continued)

*Primary Examiner* — Don Wong
*Assistant Examiner* — Todd Aguilera
(74) *Attorney, Agent, or Firm* — Fitch, Even, Tabin & Flannery LLP

(57) ABSTRACT

A system and method for allowing external execution-time adaptation of application behavior of an application in a telecommunication system without modification to the application code comprises an application having at least one break point and residing on an application server, at least one identifiable decision engine, and a listing of break points that has for each break point at least one identifier of the decision engine, such that at one of the break points, the application accesses the listing of break points, invokes the listed instances of the decision engine corresponding to the break point, and adapts application behavior based on the decision engine. In addition, each entry in the listing of break points can have a sequence number so that if two entries for the same break point have equal sequence numbers, the decision engines identified in these entries can be invoked in parallel.

10 Claims, 3 Drawing Sheets

U.S. PATENT DOCUMENTS

| | | | | |
|---|---|---|---|---|
| 6,967,957 | B2 | 11/2005 | Anjum et al. | 370/401 |
| 6,970,901 | B1 | 11/2005 | Moritz | 709/200 |
| 7,032,213 | B1 | 4/2006 | Lupu et al. | |
| 7,100,172 | B2 * | 8/2006 | Voellm et al. | 719/332 |
| 7,111,053 | B1 | 9/2006 | Black et al. | |
| RE39,717 | E * | 7/2007 | Yates et al. | 709/201 |
| 7,506,316 | B2 * | 3/2009 | Vertes | 717/130 |
| 7,765,525 | B1 * | 7/2010 | Davidson et al. | 717/124 |
| 7,802,245 | B2 * | 9/2010 | Sonnier et al. | 717/171 |
| 7,886,287 | B1 * | 2/2011 | Davda | 717/168 |
| 7,930,691 | B2 * | 4/2011 | Bhattacharya et al. | 717/171 |
| 2002/0073410 | A1 * | 6/2002 | Lundback et al. | 717/171 |
| 2003/0208745 | A1 | 11/2003 | Bystricky et al. | |
| 2005/0081196 | A1 * | 4/2005 | Lee et al. | 717/168 |

FOREIGN PATENT DOCUMENTS

| | | |
|---|---|---|
| JP | 07-073032 | 3/1995 |
| JP | 10-289119 | 10/1998 |
| JP | 2006-268738 | 10/2006 |

OTHER PUBLICATIONS

Segal, M., et al., "On-The-Fly Program Modification: Systems for Dynamic Updating", IEEE Software [online], 1993 [retrieved Jul. 11, 2012], Retrieved from Internet: <http://ieeexplore.ieee.org/xpls/abs_all.jsp?arnumber=199735&tag=1>, pp. 53-65.*

Shen, J., et al., "Towards a Unified Formal Model for Supporting Mechanisms of Dynamic Component Update" Proceedings of ESEC/FSE-13 [online], 2005 [retrieved Jul. 11, 2012], Retrieved from Internet: <http://dl.acm.org/citation.cfm?id=1081720>, pp. 80-89.*

"Policy Evaluation Enforcement and Management Architecture", Draft Version 1.0—Jun. 25, 2006, Open Mobile Alliance Ltd., OMA-AD-Policy_Evaluation_Enforcement_Manangement_V1_0-2006625-D.

PCT Search Report from related PCT/US08/82240; dated Dec. 29, 2008, 5 pages.

Supplementary European Search Report from related EP Application No. 08844322.1; dated Nov. 7, 2011; 8 pages.

Examiner's report from corresponding Australian Patent Application No. 2008318350, dated Dec. 9, 2011, (2 pages).

Canadian Office Action from related Canadian Patent Application No. 2704550; dated Mar. 14, 2012; 3 pages.

Australian Examiner's Report No. 2 from related Australian Patent Application No. 2008318350; dated Jun. 1, 2012; 2 pages.

Notice of Rejection from related Japanese Patent Application No. 2010-532317; dated Sep. 4, 2012; 2 pages.

Nakata, Mitsuru; "Network Programming using the RPC," Open Design No. 11, Dec. 1, 1995, pp. 58-77 (22 pages).

Notice of Rejection from related Japanese Patent Application No. 2010-532317; dated Feb. 19, 2013; 2 pages.

* cited by examiner

METHOD AND SYSTEM FOR POLICY ENABLED PROGRAMMING

FIELD OF THE INVENTION

The present invention relates generally to programming of communications, information and entertainment services.

BACKGROUND OF THE INVENTION

Software applications written in a traditional manner have all the functionality defined within application code. Once such applications are deployed, the providers offering the applications have little leeway to affect the behavior of the application. The application may have a few parameters that can be adjusted, but generally the behavior of the application is fixed unless the application code is modified.

Service providers wishing to address dynamic markets need the flexibility to offer new services rapidly. The cycle time associated with modifying application code can slow the process down unacceptably. Therefore, there is a need for application code in which the behavior can be modified without waiting for a software release.

Similar motivations were involved in the development of the Intelligent Network and Advanced Intelligent Network concepts for constructing telephone network services. It was possible to build new services by changing the code within the telephone switch, but this was rather slow and cumbersome. The approach chosen was to precisely define the call model that specified the state of the telephone switch software in establishing a connection between two parties. At various points in the call model, the telephone switch could be configured to query an external service control point for instructions on how to proceed. New service functionality could be produced by changing the behavior of the logic in the service control point without making changes to the software within the switching system itself.

This approach is highly dependent on the common call model that specifies the state of the switching system and the expected behavior. Such a call model could be defined because the process of establishing calls is consistent from one system to another. Definition and agreement of the call model took a substantial amount of time, which was tolerable because the processing of telephone calls was relatively static over time. In environments where providers are offering new and varied services on a frequent basis, it will not be possible to define such a detailed model for the internal states of the service logic. While this common call model technique has desirable characteristics, it cannot be applied directly to the processing of emerging, new and varied services.

Telecommunications equipment vendors and operators addressed a similar problem in adding features to call processing systems. The agreed upon solution, the basis for the Advanced Intelligent Network (AIN), defines another common call model as the basis for processing the establishment of telephone calls. This common call model provides a predefined set of events where external systems can be queried for decisions. U.S. Pat. No. 5,940,487, "Programmable call processing system and method", Bunch et al., for example, illustrates this approach on a distributed telecommunication switching system coupled to AIN. This separation of service switching points (switches), which process calls, and service control points, which process service logic, allows new calling services to be defined without making changes to the software within the switch. This approach worked well for controlling telephone calling in the circuit switched networks, and was extended into next-generation packet-switched networks through the results of industry forums such as the Parlay Group specifications and the Java Community Process JAIN specification. The fact that there is a need for such standardization is indicative of the limitations of this approach, in that it deals with a specific functionality (call control) and requires advance agreement and/or standardization to function. Thus this approach is appropriate for application functionality that is static over time.

In U.S. Pat. No. 6,970,901, "Device and method for swapping out a part of a service logic program", Moritz teaches a mechanism for distributing service logic across multiple entities. Moritz specifically focuses on making use of the increasing capabilities of intelligent terminal devices acting as client terminals, by distributing a portion of the service logic to the client terminal. Moritz discloses methods for using this distributed approach for determining charging related information. Distribution to client devices can enable personalization, but does not easily enable modification of the behavior of an overall service, because the change would have to be propagated to all of the client terminal devices. Enabling distribution for a single topic, such as charging, is simplified because the communication mechanism (the "charge ticket" in Moritz) can be defined and coded in advance. Thus Moritz addresses the need for flexible service logic programs, but in a very limited domain.

In U.S. Pat. No. 6,967,957, "Architecture for the rapid creation of telephony services in a next generation network", Anjum et al. describe an object-oriented call model, which "hides the detail of the underlying call-state management protocols and hardware from applications". Specifically, Anjum et al. describe a new call model that is designed to be abstract enough to represent call control in both circuit-switched and packet switched telephony networks. Such a call model is more flexible than the Java Telephony Application Programming Interface (JTAPI) model on which it was based, but still represents a single functionality. Thus this model is not applicable in the more general case where the behaviors are not as well defined, or known clearly in advance.

The Policy Evaluation Enforcement Management (PEEM) effort within the Open Mobile Alliance (OMA), as specified in the draft requirements document "Policy Evaluation, Enforcement and Management Architecture" (OMA-AD-Policy_Evaluation_Enforcement_Management-V1_0-200600625-D) describes an architecture for policy-evaluation and execution as support for the OMA's service enablers. These enablers include functions such as group list management, messaging and location. The architecture is designed to provide a common framework for these enablers to query for a policy decision. Such a capability would be useful, although not required, as a building block for the policy-enabled programming described here, because it would simplify the process of mapping interfaces between systems. The OMA work, however, does not specify how an enabler would determine when to query a policy engine (the PEEM enabler), or which policy engine to query.

Another approach is that supported by workflow systems. In these systems, which are often applied to complex order processing, the set of processing steps is defined in textual fashion that is interpreted at run time, rather than compiled in the manner of software code. This provides flexibility, in that the workflow can be modified without changing the code of the workflow engine. However, the interpretation operation is inefficient, leading to performance that is adequate for order processing but generally insufficient for the execution of actual services.

Database systems provide yet another mechanism where triggers and stored procedures can be invoked to execute logic, providing a great deal of flexibility. However, the operations where the stored procedures can be executed exist only for database operations of insert, delete, update and select on the data in the database. The problem with this approach is the restriction for database operations; the entire specification is within the database system and not easily referenceable or modifiable unless one navigates through the data and the associated triggers and stored procedures.

Hence, current processes are restricted to specific types of software applications, e.g., call processing, and have required advanced agreement and/or standardization of the application processing model before they could be used. Other current processes exist only within middleware, such as databases or workflow systems, which limits their scope and does not meet performance requirements for service execution.

Thus there is a need for a system capable of determining dynamically when and where to query an external descision point, such as a policy engine. There is also a need for a structured and efficient mechanism for configuring such dynamic queries, characterized by breakpoints that can be configured to a controlled set of options.

BRIEF SUMMARY OF THE INVENTION

The present invention advantageously provides a design architecture and methodology for building and deploying application software that allows the behavior of the application to be adapted or configured during execution without making changes to the application code. Reuse of a single software application multiple times for different purposes by configuration or adaptation of the application is provided. Furthermore, the inventive system and method enables rapid deployment of new service behaviors because they can be delivered without the delays associated with the software development cycle.

A system and method for allowing external execution-time adaptation of application behavior of an application in a telecommunication system comprises an application having at least one break point and residing on an application server, at least one identifiable decision engine, and a listing of break points that has for each break point at least one identifier of the decision engine, such that at one of the break points, the application accesses the listing of break points, invokes the listed instances of the decision engine corresponding to the break point, and adapts application behavior based on the decision engine.

The listing of break points can be a file external to the application, and can contain attribute mapping for each identifier and an action type for each identifier and, in addition, can dynamically map the break point to the decision engine.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION

A system and method to allow external execution-time adaptation of application behavior is presented. The key characteristics of this approach are that it provides application developers with the performance associated with compiled code as well as the flexibility to define the decision points and possible actions within the application flow, allows for dynamic mapping of those decision points to external evaluation engines, and enables application behaviors to be configured as the application is being deployed or even while the application is executing, rather that only during the design and development of the application.

There are two specific mechanisms that support such a system and method. The first is an external table such as a break point configuration table. The application reads this table when it reaches a defined break point during execution to determine what actions to take. The entries in this table can be defined separately from the application, and even changed while the application is running, based on knowledge of what attributes or variables the application has defined at a given break point. The second adaptation method is contained in the external systems. The logic, policies and/or rules within these systems will create responses that will influence the subsequent flow and behavior of the application. With these two mechanisms, the behavior of applications can be significantly modified without having to re-write or modify the application code.

Figure 1:
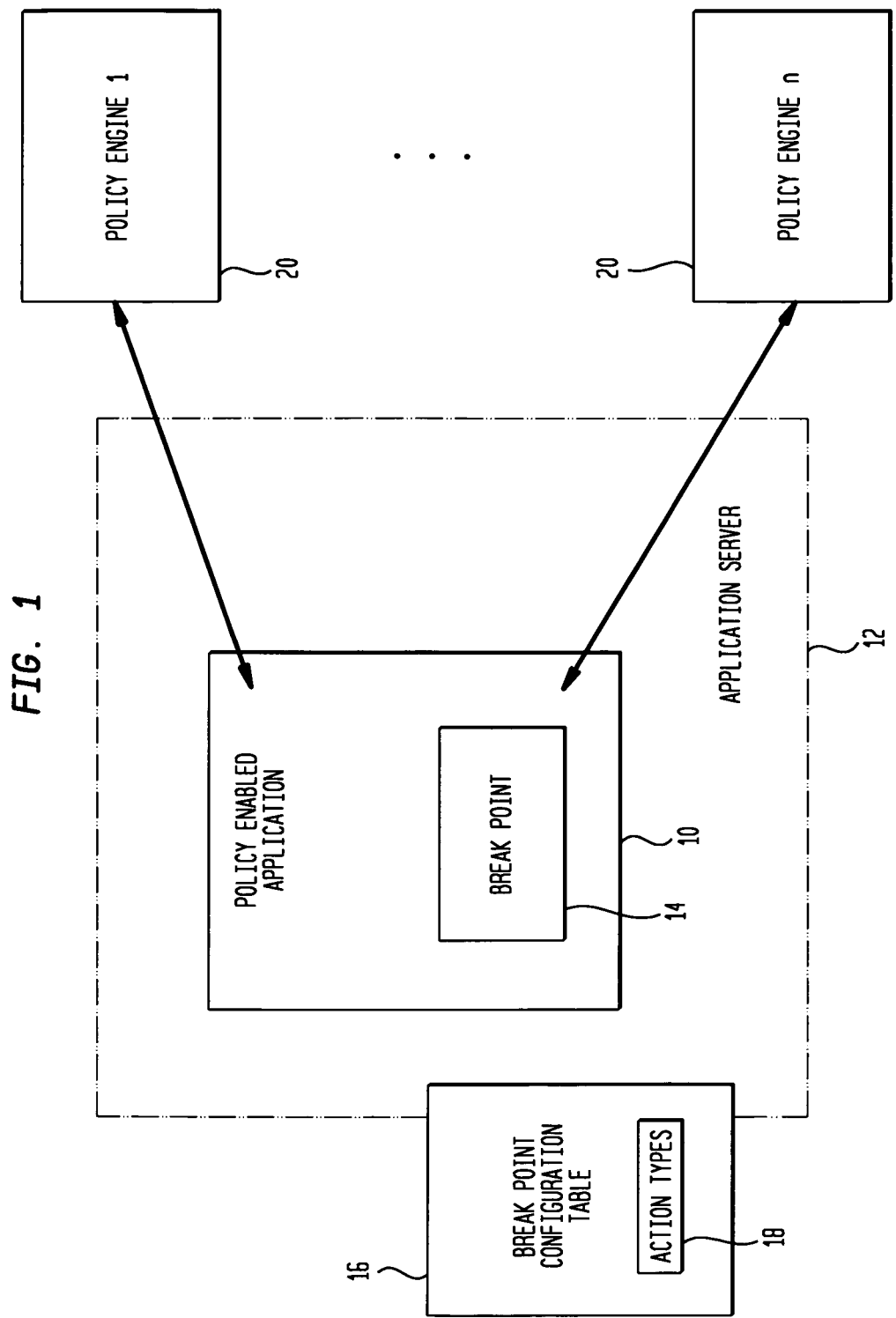
FIG. 1 is an architecture for policy-enabled program execution.

FIG. 1 illustrates one embodiment of the inventive system. A policy enabled application 10 resides in an application server 12 in a telecommunication system (not shown). The policy enabled application 10 is constructed with a specified set of configurable break points 14 within the flow of the application logic. When the execution of the application code reaches one of these break points 14, the application code looks to a listing of break point configurations or an external table 16, such as a break point configuration table, containing data including action types 18. By evaluating this data, the application 10 can determine the action to be taken at the break point 14. In order to manage the complexity of the table, the number of possible action types can be limited. The general action would be for the application to transmit data to an external system 20 and use the resulting response to determine the application's subsequent actions. These subsequent actions are executed as part of the application 10, as defined within its compiled code, with the associated performance. The external system 20 could be a decision engine, a policy engine or a policy decision point that would accept input from the application 10, apply a defined set of one or more policies, and provide a response. The application's behavior is altered by modifying one or more of the policies, instead of by making changes to the application's code. In an alternative embodiment, a jump table (not shown) can be implemented within the application 10. In such a case, the application behavior could be changed by modifying the processing of the external decision point, or by modifying and re-compiling the application 10.

Note that the external system 20 could also be a workflow system, database system or even another software application. The fact that the mapping can be changed to point to different software applications provides flexibility even if the decision points are hard coded in the policy enabled application 10.

There are many ways in which a policy enabled application 10 may react to the response it receives from an external policy engine 20. Building an application 10 that gives an external system 20 complete flexibility in determining its subsequent behavior would be extremely difficult and error prone. Through appropriate limitations on the range of action types or options 18, however, the complexity can be kept at a manageable level. Specifically, the application 10 could be designed to support a limited number of action types 18 based on the response provided by the external system 20. Examples of these action types 18 could include a fork or two-way decision point action, a null action, and a variable replacement action.

In the case of a two-way decision action 18, the application 10 sends a message to an external system 20 and the external system provides a binary, i.e. "yes/no" or "true/false", response. The application 10 then follows one pre-defined path if the response is a "yes" and another path if the response is a "no". While the application 10 performs only one of two options in this decision action 18, the overall behavior can vary widely based on the policies or processes used by the external systems 20 to make decisions. This can be extended to multi-way decision actions where multiple paths are possible.

As an example, an application 10 designed to deliver or transmit a digital content item to a user could include a break point 14 just before transmitting the content. In response to this break point 14, the application 10 supplies information identifying both the user and the list of content items in a query to an external policy engine 20. The application 10 is programmed to proceed with the transmission of the content if the response is a "yes", and to cancel the transmission if the response is a "no". In one situation, the external system 20 could be a real-time charging engine that determines if the user has sufficient balance to pay for the items. If the user's balance is sufficient, the external system 20 debits the user account and returns a "yes". If the balance is insufficient, the external system 20 returns a "no". In another situation, the external system 20 can be an authorization system that only allows content to be downloaded to users within a certain physical location, for example, as a corporate security measure, or as a means for restaurants to attract visitors. If the user is within the location bounds specified for the content items, the external system 20 returns a "yes" and if not, the system 20 returns a "no". Hence, two very different services employing distinct external systems 20 have made use of the same content delivery policy enabled application 10.

In the case of a null action 18, the application 10 simply performs the break point 14 and continues execution. The null action is appropriate where the application simply needs to inform an external system 20 of some event. In the content download service example described above, the application 10 could be instructed to execute a break point 14 comprising a null action 18 just prior to transmitting the content. Executing the break point 14 would cause an external system 20 to record the download event, including the list of content items, so that the users with post paid accounts could be charged for the content during the next billing cycle.

In the case of a variable replacement action 18, the application 10 uses the response from the external system 20 to alter the value of a variable being processed by the application 10. In the content download service example above, the application 10 could be instructed to execute a break point 14 comprising a variable replacement action 18 just prior to transmitting the content. Performing the break point 14 could cause an external system 20 to filter the list of content items, removing those whose rating information indicates that they are not acceptable for the user, perhaps based on the age or preferences of the identified user. The external system 20 then returns the filtered list to the application 10 which replaces the initial list of content items with the filtered list, and proceeds with the download.

Other action types 18 could be defined, providing greater flexibility in the control of the application flow. Note that it is desirable to limit the number of action types or options 18 in order to avoid undue complexity in constructing the application 10.

Figure 2:
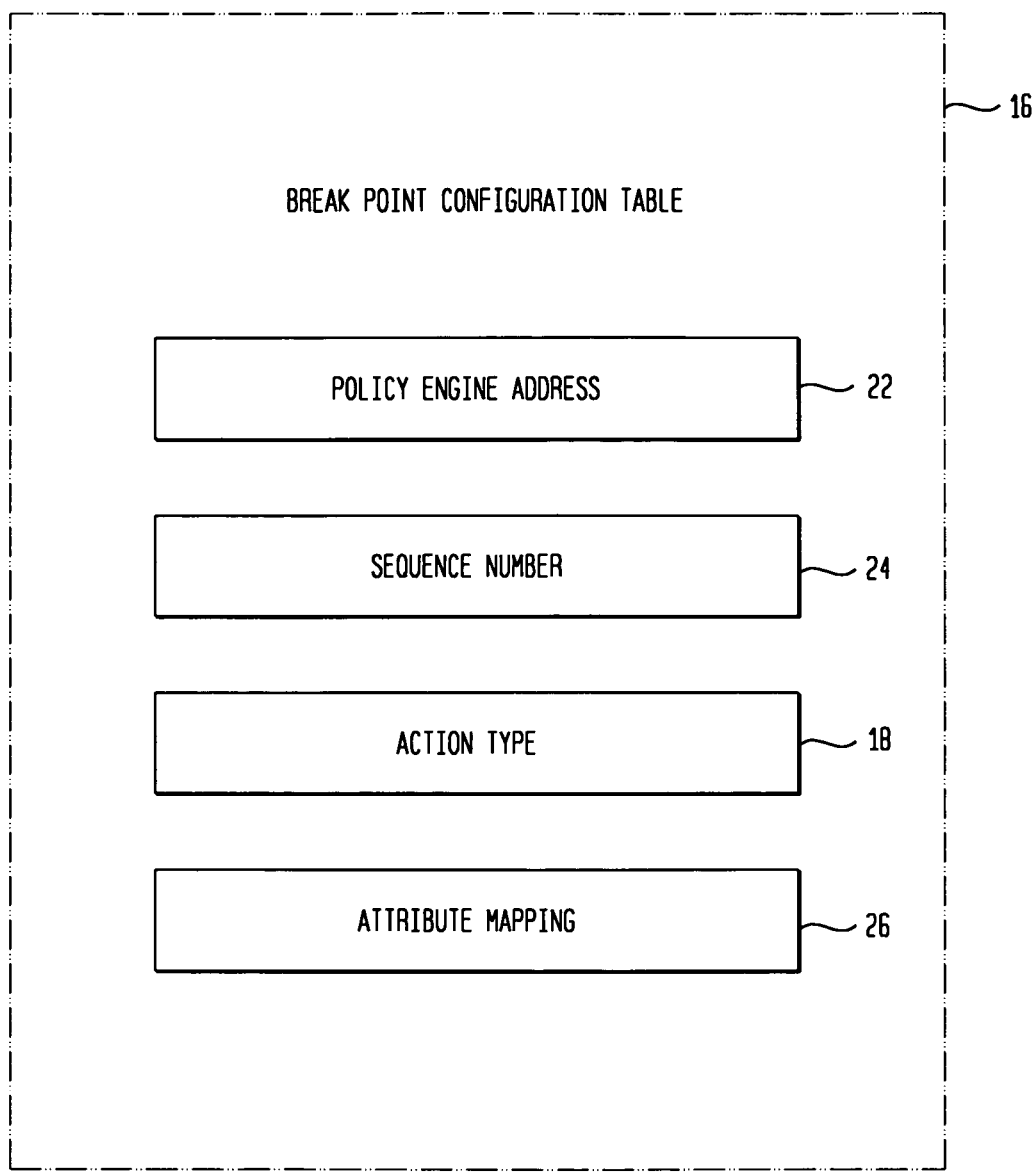
FIG. 2 is an break point configuration exemplary table.

The policy-enabled application 10 would execute within an application server 12 or service delivery platform, and would have local access to the break point configuration table 16 that would specify the application behavior associated with each break point 14. FIG. 2 shows an exemplary table 16 which could be populated by a provisioning system responsible for deploying the product/service. The table 16 comprises not only the action types 18, discussed above, but also the following fields, which are described in more detail below: an address 22 for the policy engine or external system 20, a sequence number 24 and attribute mapping 26. The policy-enabled application 10 would interact with one or more external policy decision points. The configuration table 16 links the points within the program flow where interactions can be performed with the specific decision point to interact with and the manner in which to interact (such as the attributes to transmit).

While the discussion here describes policy decision points, there is nothing in the mechanisms defined here that limits the external systems 20 to being policy evaluators. Any external system 20 with a defined invocation interface could be used in place of a policy decision point.

A simplified sample configuration table 16 is shown in Table 1. In this case, there are two break points entries associated with Break Point 1 14. For the first entry, the application 10 must perform attribute mapping 26 by sending attributes A, B and C to the PolicyEngine 1 via the system address 22 in the table 16, and use the response to replace the value of attribute C. For the second entry, the application 10 must send attributes 26 A, C and D to PolicyEngine 1 via its address 22 in the table 16, and perform a decision action 18 based on the "yes/no" response. The sequence number 24 in the sequence column indicates the order in which the invocations associated with a single break point 14 are executed. Invocations that share a sequence number 24 could be executed in parallel. In cases where no sequence numbers 24 are used, the application 10 could execute the queries in the order found in the file.

TABLE 1

Break Point Configuration Table

| Break Point ID | Break Point Type | Sequence | System Address | Attribute Mapping | Response Replacement |
|---|---|---|---|---|---|
| 1 | Variable Replacement | 1 | PolicyEngine1 | A, B, C | C |
| 1 | Fork | 2 | PolicyEngine1 | A, C, D | |
| 2 | Null | 1 | PolicyEngine2 | X, Y, Z | |

Figure 3:
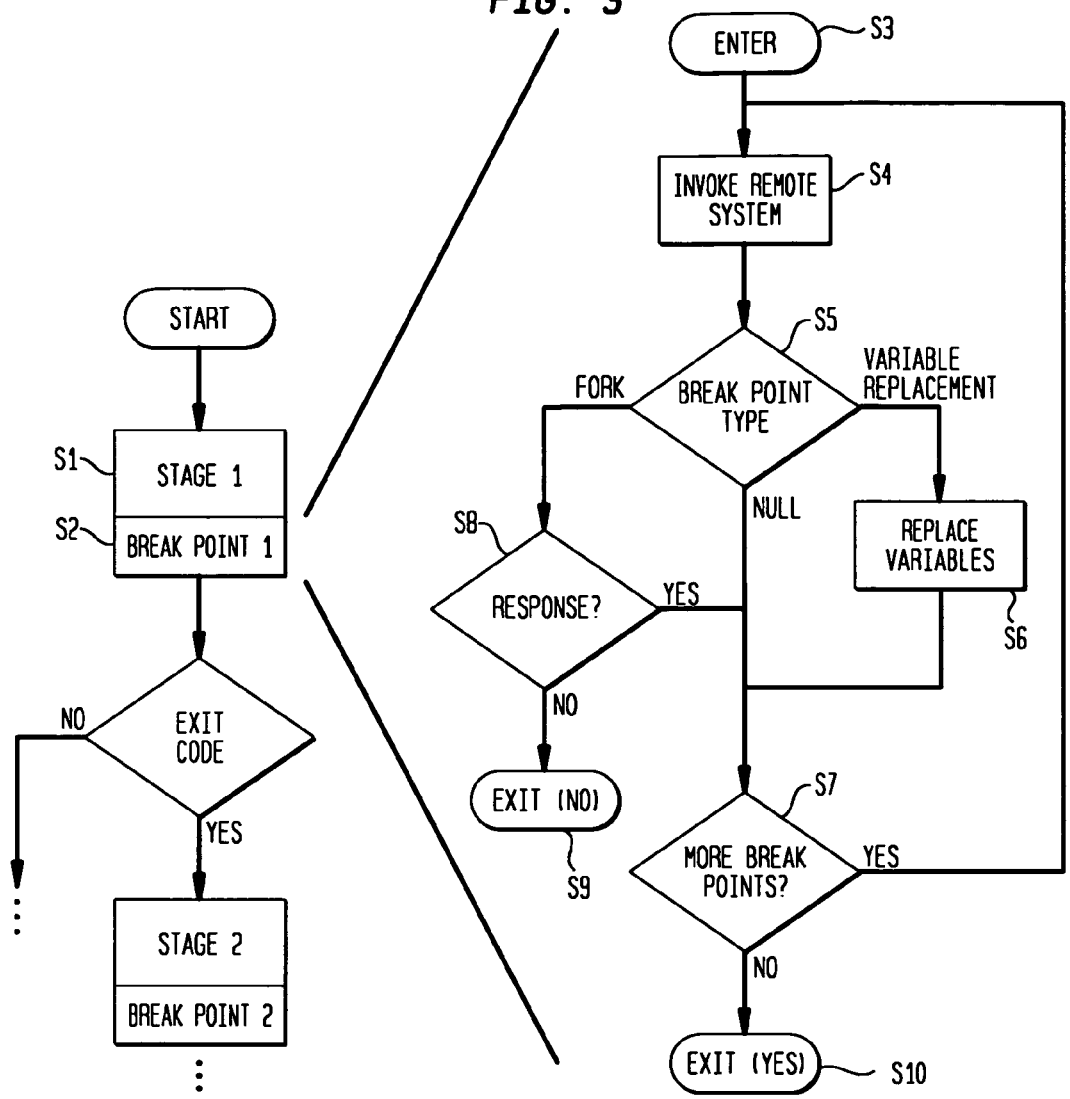
FIG. 3 is a flow chart illustrating application behavior in processing entries in the break point configuration table.

FIG. 3 contains a flow chart that illustrates the behavior of the application 10 shown in FIG. 1. Referring to the left side of the figure, upon initiation at step S1, the application 10 performs its designed activities through Stage 1. At step S2, the application reaches Break Point 1 14. At this point, the application 10 looks at the break point configuration table 16 to see if there are any entries associated with Break Point 1 14.

The right side of FIG. 3 illustrates the flow that is used within the Break Point 1 module to process these entries. Upon entry at step S3, the application 10 invokes the external system 20 at step S4, using the attribute mappings 26 defined in the table 16. When the external system 20 responds, the application 10 determines, at step S5, the type of break point or action type 18 being processed. If the action break point type 18 is Variable Replacement, the application 10, at step S6, performs the replacement as defined in the configuration table 16 and proceeds to step S7 to test if there are more break point entries 14 to be processed. If the break point type 18 is null, the application 10 need not wait for a response and proceeds directly to testing, at step S7, if more break point entries 14 need to be processed. If the break point type 18 is fork, the application 10 tests the response from the external system 20 at step S8. If the external system 20 response is "yes", the application 10 proceeds to test for more break point entries 14 at step S7. If the external system response is a "no", the application breaks out of processing any further break point entries 14 and returns to the main application flow with a "No" exit condition at step S9. When there are no more break point entries 14 to be processed, the application 10 returns to the main application flow with a "Yes" exit condition at step S10.

Handling of exceptions and error conditions in the interactions with the external systems 20 is not shown. The application 10 could be programmed with various exception handling behaviors to deal with returned errors or time-outs with no response. Alternatively, the table could be extended to indicate the actions to be taken in the case of certain handled exceptions. The manner in which the application 10 deals with these situations is not critical to this mechanism.

A key aspect of this dynamic programming approach is that the application break points 14 can be mapped dynamically to decision point systems 20 and to specific policies within them. There are numerous methods in which this mapping could be performed. Perhaps the most straightforward is a manual approach, where human analysts create the break point configuration table 16, define the policies that correspond to each break point 14, load the configuration table 16 into the application server 12 and load the policies into the decision point. A greater degree of automation and validation in this mapping process is possible if the application break points 14 and policies can be made visible in a structured fashion.

A design environment could import the structured representation of all the break points 14 in an application 10 selected by the user. The environment could retrieve policies from decision points known to it. When the human user selects a break point 14, a brief representation of which is shown in Table 2, the environment could retrieve and present only those policies that are valid. For example, if the break point 14 only allowed forking operations or two-way decision actions 18, only those policies that return yes/no or true/false values would be appropriate. After selecting a policy, the user would map the variables available from the software application 20 at the chosen break point 14 to those specified in the interface to the policy, as shown in Table 3. The environment could then validate the mappings, for example ensuring that the types, e.g., string, integer, etc., match. After all the mappings are successfully defined in this manner, the environment could create the corresponding break point configuration table 16 and install it on the application server 12.

TABLE 2

Abbreviated Break Point Representation Structure

Break Point
Name
Description
Allowed Types (Null, Variable Replacement, Fork)
Variables available (name and type)
...

TABLE 3

Abbreviated Policy Invocation Interface Structure

Policy
Name
Description
Input [variable1 (name/type), variable2...]
Output [variable1 (name/type), variable2...]
...

While the present invention has been described in particular embodiments, it should be appreciated that the present invention should not be construed as limited by such embodiments, but rather construed according to the claims below.

What is claimed is:

1. A method for allowing external execution-time adaptation of behavior of an application in a telecommunication system, the method comprising:
   accessing a list of break point configurations external to the application at individual break points in an application, the list of break point configurations having at least one identifier of at least one decision engine that is external to the application for the individual break points, the list of break point configurations being configured to permit modification of the at least one identifier of the at least one decision engine while the application is executing, the at least one decision engine being configured to be modified without editing the application while the application is executing;
   invoking the at least one decision engine corresponding to the individual break points using the at least one identifier;
   adapting the application behavior based at least in part on the modification of at least one of the at least one identifier of the at least one decision engine of the listing of break point configurations and the at least one decision engine,
   wherein accessing the list comprises accessing a sequence number associated with the at least one decision engine corresponding to the at least one break point in the listing; and
   invoking more than one decision engine in parallel in response to more than one decision engine existing for a break point and the sequence number for individual ones of the more than one decision engine being equal.

2. The method according to claim 1, wherein accessing the list comprises accessing attribute mapping for the at least one identifier and an action type for the at least one identifier.

3. The method according to claim 1, further comprising dynamically mapping individual break points to at least one corresponding decision engine.

4. A system for allowing external execution-time adaptation of behavior of an application, the system comprising:
   at least one decision engine adapted to operate on a decision engine computing device, the at least one decision engine configured to interact with an application residing on an application server, the application server comprising a server computing device separate from the decision engine computing device, wherein the at least one decision engine is external to the application and wherein the application has at least one break point, the at least one decision engine configured to be modified without editing the application while the application is executing; and at least one storage element operably connected to the application server, the at least one storage element configured to contain a listing of break point configurations comprising at least one identifier of the at least one decision engine for the at least one break point, the application being configured to access the listing of break point configurations at the at least one break point, the listing of break point configurations being configured to permit modification of the at least one identifier of the at least one decision engine while the application is executing, wherein the at least one decision engine is configured to enable the application to invoke the at least one decision engine for the at least one break point using the at least one identifier, and wherein at least one of the listing of break point configurations and the at least one decision engine are configured to adapt behavior of the application while the application is executing based at least in part on the modification of the at least one identifier of the at least one decision engine in the listing of break point configurations and the modification of the at least one decision engine;

wherein the listing of break point configurations further comprises a sequence number associated with the at least one decision engine in the listing; and the application is configured to invoke more than one decision engine in parallel in response to more than one decision engine existing for a break point and the sequence number for individual ones of the more than one decision engine being equal.

5. The system according to claim 4, wherein the storage element is configured to maintain the listing of break point configurations external to the application.

6. The system according to claim 4, wherein the listing of break point configurations further comprises attribute mapping for the at least one identifier and an action type for the at least one identifier.

7. The system according to claim 4, wherein the listing of break point configurations is configured to dynamically map the at least one break point to the corresponding at least one decision engine.

8. An article of manufacture including a non-transitory computer-readable medium having instructions stored thereon that, in response to execution by a computing device, cause the computing device to perform operations comprising:

accessing a list of break point configurations external to the application at individual break points in an application, the list of break point configurations having at least one identifier of at least one decision engine external to the application for the individual break points, the list of break point configurations being configured to permit modification of the at least one identifier for the at least one decision engine while the application is executing, the decision engine being configured to be modified without editing the application while the application is executing;

invoking the at least one decision engine corresponding to the individual break points using the at least one identifier;

adapting the application behavior based at least in part on the modification of at least one of the at least one identifier of the at least one decision engine of the listing of break point configurations and the at least one decision engine, wherein accessing the list comprises accessing a sequence number associated with the at least one decision engine corresponding to the at least one break point in the listing; and invoking more than one decision engine in parallel in response to more than one decision engine existing for a break point and the sequence number for individual ones of the more than one decision engine being equal.

9. The article of manufacture of claim 8, wherein accessing the list comprises accessing attribute mapping for the at least one identifier and an action type for the at least one identifier.

10. The article of manufacture of claim 8, wherein the instructions further cause the computing device to dynamically map individual break points to at least one corresponding decision engine.

* * * * *

UNITED STATES PATENT AND TRADEMARK OFFICE
CERTIFICATE OF CORRECTION

| | | |
|---|---|---|
| PATENT NO. | : 8,448,159 B2 | Page 1 of 1 |
| APPLICATION NO. | : 11/982675 | |
| DATED | : May 21, 2013 | |
| INVENTOR(S) | : Cochinwala et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1383 days.

Signed and Sealed this
Sixteenth Day of December, 2014

Michelle K. Lee
*Deputy Director of the United States Patent and Trademark Office*